US012591927B2

(12) United States Patent
Cunningham et al.

(10) Patent No.: US 12,591,927 B2
(45) Date of Patent: Mar. 31, 2026

(54) SYSTEMS AND METHODS FOR DETERMINING A GRAPHICAL USER INTERFACE FOR GOAL DEVELOPMENT

(71) Applicant: Capital One Services, LLC, McLean, VA (US)

(72) Inventors: Sarah J. Cunningham, Arlington, VA (US); Christopher R. Carter, McLean, VA (US); Mykhaylo Bulgakov, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 731 days.

(21) Appl. No.: 17/328,573

(22) Filed: May 24, 2021

(65) Prior Publication Data

US 2021/0279794 A1     Sep. 9, 2021

Related U.S. Application Data

(63) Continuation of application No. 16/793,800, filed on Feb. 18, 2020, now Pat. No. 11,017,466.

(51) Int. Cl.
G06Q 40/02          (2023.01)
G06N 20/00          (2019.01)
(Continued)

(52) U.S. Cl.
CPC ............. *G06Q 40/02* (2013.01); *G06N 20/00* (2019.01); *G06Q 20/108* (2013.01); *G09B 19/18* (2013.01)

(58) Field of Classification Search
None
See application file for complete search history.

(56) References Cited

U.S. PATENT DOCUMENTS 9,026,922 B2     5/2015   Dhaliwal et al.
9,529,841 B1    12/2016   Girdwood et al.
(Continued)

OTHER PUBLICATIONS

Mulvey, John M. "Machine learning and financial planning." IEEE Potentials 36.6 (2017): 8-13 (Year: 2017).*
(Continued)

*Primary Examiner* — Darlene Garcia-Guerra
(74) *Attorney, Agent, or Firm* — Bookoff McAndrews, PLLC

(57)          ABSTRACT

A computer-implemented method for graphical user interface goal vision development may include receiving, via one or more processors, a first user financial goal of a user from a user device associated with the user; obtaining, via the one or more processors, at least one first user digital image; associating, via the one or more processors, the first user financial goal and the at least one first user digital image; obtaining, via the one or more processors, first user specific data relevant to the first user financial goal; transmitting, via the one or more processors, a digital visualization board indicative of the associated first user financial goal and the at least one first user digital image to the user device; determining, via the one or more processors, activity associated with the first user financial goal based on the first user specific data, by processing data including the obtained first user specific data using a trained machine learning model; and transmitting, via the one or more processors, a notification to the user device, wherein the notification is indicative of a suggested plan to achieve the first user financial goal, and wherein the notification is based on the determined activity and the first user financial goal.

20 Claims, 5 Drawing Sheets

(51) Int. Cl.
   *G06Q 20/10*          (2012.01)
   *G09B 19/18*          (2006.01)

(56)                    References Cited

U.S. PATENT DOCUMENTS

| | | | | |
|---|---|---|---|---|
| 10,984,666 | B1 * | 4/2021 | Depaolo | G06F 16/337 |
| 11,094,016 | B1 * | 8/2021 | Welz | G06N 7/01 |
| 11,127,075 | B1 * | 9/2021 | Mahoney | G06N 20/00 |
| 11,270,331 | B1 * | 3/2022 | Breitweiser | G06Q 40/08 |
| 2006/0074788 | A1 | 4/2006 | Grizack et al. | |
| 2009/0055270 | A1 * | 2/2009 | Magdon-Ismail | G06F 16/957 |
| | | | | 705/14.27 |
| 2010/0280935 | A1 * | 11/2010 | Fellowes | G06Q 40/00 |
| | | | | 705/35 |
| 2014/0067634 | A1 * | 3/2014 | Sowder | G06Q 40/06 |
| | | | | 705/35 |
| 2017/0262770 | A1 * | 9/2017 | Purdy | G06N 20/20 |
| 2020/0104763 | A1 * | 4/2020 | Carney | G06Q 10/04 |
| 2020/0258158 | A1 * | 8/2020 | Gilliam | G06Q 40/03 |
| 2020/0380596 | A1 * | 12/2020 | Lopez | G06Q 20/405 |
| 2021/0042674 | A1 * | 2/2021 | Chan | G06Q 10/0637 |
| 2022/0028001 | A1 * | 1/2022 | Wachell | G06Q 10/0637 |

OTHER PUBLICATIONS

Filbeck, Greg, et al. "Behavioral finance: A panel discussion." Journal of Behavioral and Experimental Finance 15 (2017): 52-58 (Year: 2017).*

Hai, Feng. "Next generation financial guidance tool." University of California Berkeley (2014) (Year: 2014).*

Azarenkova, Galyna, et al. "Financial planning and improving of its methods." Accounting and Financial Control 1.1 (2017): 39-47 (Year: 2017).*

* cited by examiner

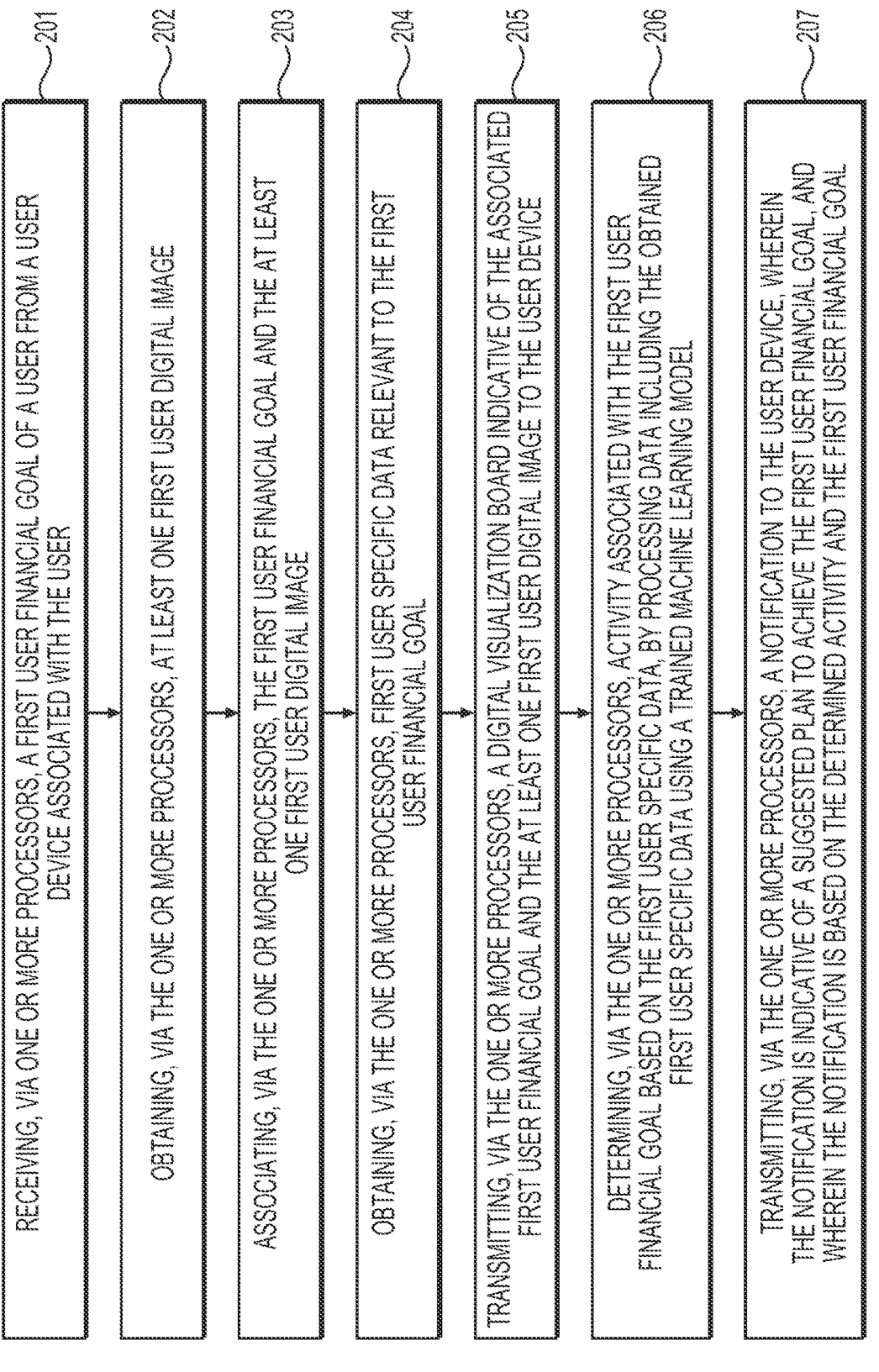

RECEIVING, VIA ONE OR MORE PROCESSORS, A FIRST USER FINANCIAL GOAL OF A USER FROM A USER DEVICE ASSOCIATED WITH THE USER — 201

OBTAINING, VIA THE ONE OR MORE PROCESSORS, AT LEAST ONE FIRST USER DIGITAL IMAGE — 202

ASSOCIATING, VIA THE ONE OR MORE PROCESSORS, THE FIRST USER FINANCIAL GOAL AND THE AT LEAST ONE FIRST USER DIGITAL IMAGE — 203

OBTAINING, VIA THE ONE OR MORE PROCESSORS, FIRST USER SPECIFIC DATA RELEVANT TO THE FIRST USER FINANCIAL GOAL — 204

TRANSMITTING, VIA THE ONE OR MORE PROCESSORS, A DIGITAL VISUALIZATION BOARD INDICATIVE OF THE ASSOCIATED FIRST USER FINANCIAL GOAL AND THE AT LEAST ONE FIRST USER DIGITAL IMAGE TO THE USER DEVICE — 205

DETERMINING, VIA THE ONE OR MORE PROCESSORS, ACTIVITY ASSOCIATED WITH THE FIRST USER FINANCIAL GOAL BASED ON THE FIRST USER SPECIFIC DATA, BY PROCESSING DATA INCLUDING THE OBTAINED FIRST USER SPECIFIC DATA USING A TRAINED MACHINE LEARNING MODEL — 206

TRANSMITTING, VIA THE ONE OR MORE PROCESSORS, A NOTIFICATION TO THE USER DEVICE, WHEREIN THE NOTIFICATION IS INDICATIVE OF A SUGGESTED PLAN TO ACHIEVE THE FIRST USER FINANCIAL GOAL, AND WHEREIN THE NOTIFICATION IS BASED ON THE DETERMINED ACTIVITY AND THE FIRST USER FINANCIAL GOAL — 207

*FIG. 2*

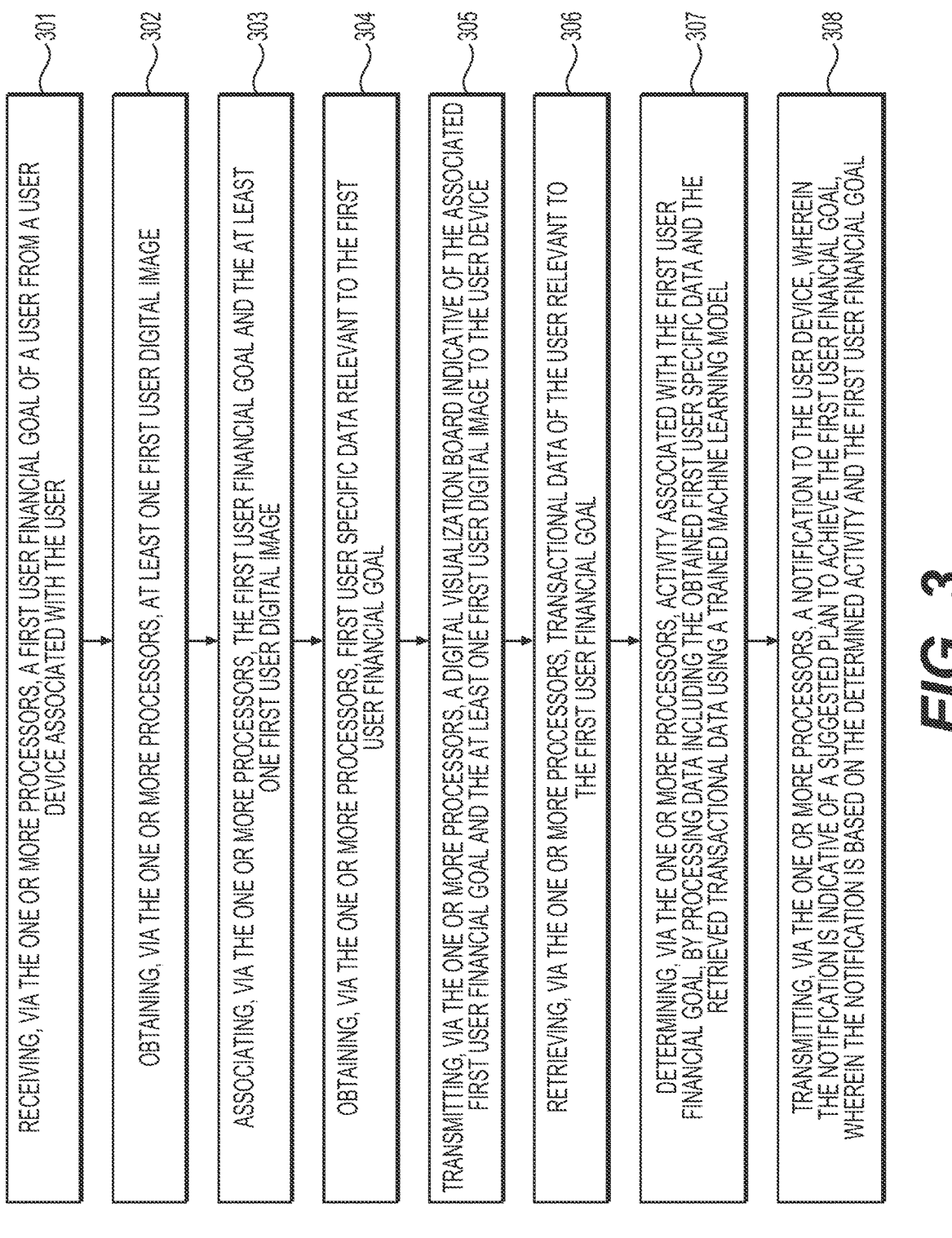

RECEIVING, VIA THE ONE OR MORE PROCESSORS, A FIRST USER FINANCIAL GOAL OF A USER FROM A USER DEVICE ASSOCIATED WITH THE USER — 301

OBTAINING, VIA THE ONE OR MORE PROCESSORS, AT LEAST ONE FIRST USER DIGITAL IMAGE — 302

ASSOCIATING, VIA THE ONE OR MORE PROCESSORS, THE FIRST USER FINANCIAL GOAL AND THE AT LEAST ONE FIRST USER DIGITAL IMAGE — 303

OBTAINING, VIA THE ONE OR MORE PROCESSORS, FIRST USER SPECIFIC DATA RELEVANT TO THE FIRST USER FINANCIAL GOAL — 304

TRANSMITTING, VIA THE ONE OR MORE PROCESSORS, A DIGITAL VISUALIZATION BOARD INDICATIVE OF THE ASSOCIATED FIRST USER FINANCIAL GOAL AND THE AT LEAST ONE FIRST USER DIGITAL IMAGE TO THE USER DEVICE — 305

RETRIEVING, VIA THE ONE OR MORE PROCESSORS, TRANSACTIONAL DATA OF THE USER RELEVANT TO THE FIRST USER FINANCIAL GOAL — 306

DETERMINING, VIA THE ONE OR MORE PROCESSORS, ACTIVITY ASSOCIATED WITH THE FIRST USER FINANCIAL GOAL, BY PROCESSING DATA INCLUDING THE OBTAINED FIRST USER SPECIFIC DATA AND THE RETRIEVED TRANSACTIONAL DATA USING A TRAINED MACHINE LEARNING MODEL — 307

TRANSMITTING, VIA THE ONE OR MORE PROCESSORS, A NOTIFICATION TO THE USER DEVICE, WHEREIN THE NOTIFICATION IS INDICATIVE OF A SUGGESTED PLAN TO ACHIEVE THE FIRST USER FINANCIAL GOAL, WHEREIN THE NOTIFICATION IS BASED ON THE DETERMINED ACTIVITY AND THE FIRST USER FINANCIAL GOAL — 308

*FIG. 3*

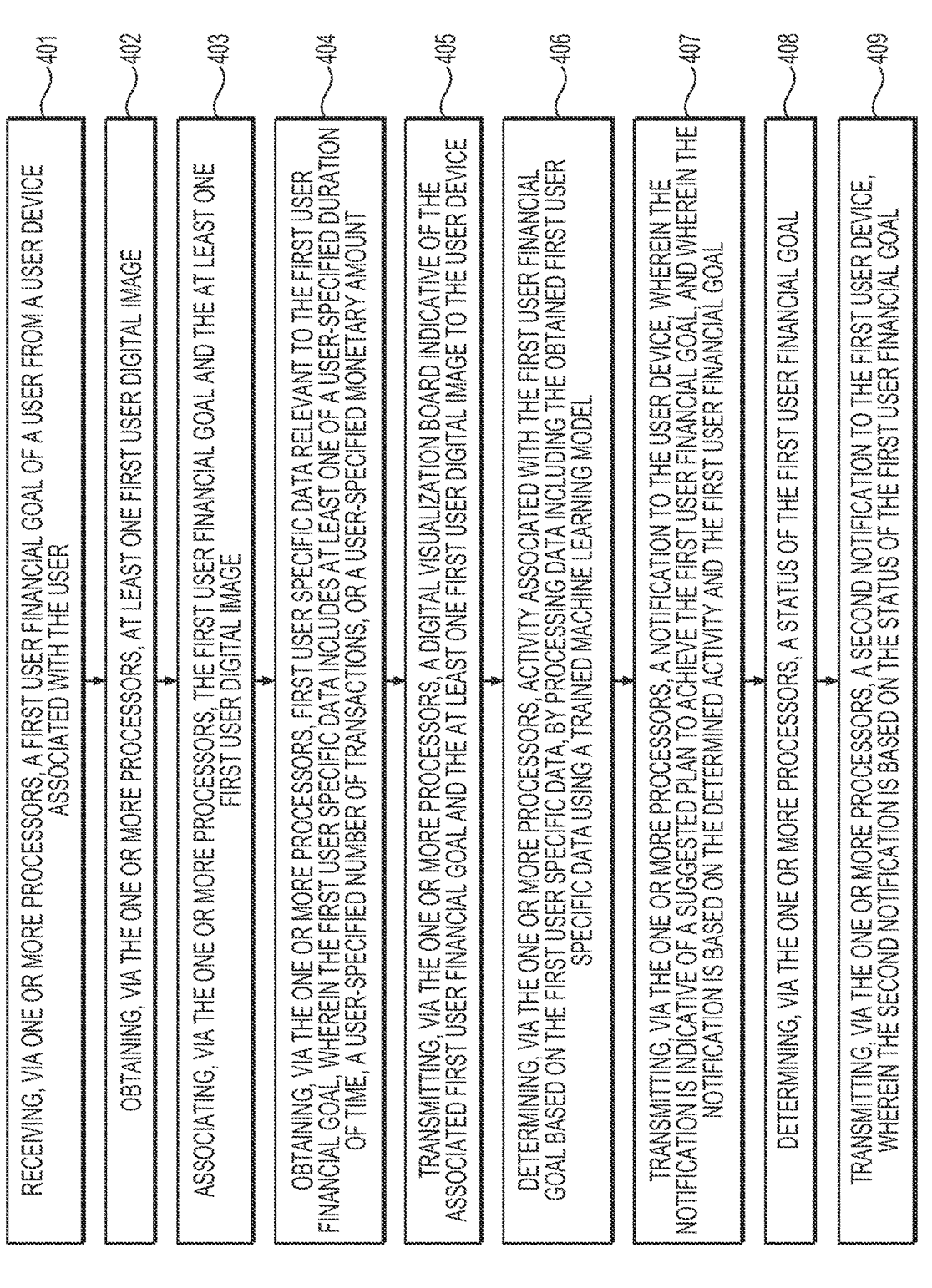

RECEIVING, VIA ONE OR MORE PROCESSORS, A FIRST USER FINANCIAL GOAL OF A USER FROM A USER DEVICE ASSOCIATED WITH THE USER — 401

OBTAINING, VIA THE ONE OR MORE PROCESSORS, AT LEAST ONE FIRST USER DIGITAL IMAGE — 402

ASSOCIATING, VIA THE ONE OR MORE PROCESSORS, THE FIRST USER FINANCIAL GOAL AND THE AT LEAST ONE FIRST USER DIGITAL IMAGE — 403

OBTAINING, VIA THE ONE OR MORE PROCESSORS, FIRST USER SPECIFIC DATA RELEVANT TO THE FIRST USER FINANCIAL GOAL, WHEREIN THE FIRST USER SPECIFIC DATA INCLUDES AT LEAST ONE OF A USER-SPECIFIED DURATION OF TIME, A USER-SPECIFIED NUMBER OF TRANSACTIONS, OR A USER-SPECIFIED MONETARY AMOUNT — 404

TRANSMITTING, VIA THE ONE OR MORE PROCESSORS, A DIGITAL VISUALIZATION BOARD INDICATIVE OF THE ASSOCIATED FIRST USER FINANCIAL GOAL AND THE AT LEAST ONE FIRST USER DIGITAL IMAGE TO THE USER DEVICE — 405

DETERMINING, VIA THE ONE OR MORE PROCESSORS, ACTIVITY ASSOCIATED WITH THE FIRST USER FINANCIAL GOAL BASED ON THE FIRST USER SPECIFIC DATA, BY PROCESSING DATA INCLUDING THE OBTAINED FIRST USER SPECIFIC DATA USING A TRAINED MACHINE LEARNING MODEL — 406

TRANSMITTING, VIA THE ONE OR MORE PROCESSORS, A NOTIFICATION TO THE USER DEVICE, WHEREIN THE NOTIFICATION IS INDICATIVE OF A SUGGESTED PLAN TO ACHIEVE THE FIRST USER FINANCIAL GOAL, AND WHEREIN THE NOTIFICATION IS BASED ON THE DETERMINED ACTIVITY AND THE FIRST USER FINANCIAL GOAL — 407

DETERMINING, VIA THE ONE OR MORE PROCESSORS, A STATUS OF THE FIRST USER FINANCIAL GOAL — 408

TRANSMITTING, VIA THE ONE OR MORE PROCESSORS, A SECOND NOTIFICATION TO THE FIRST USER DEVICE, WHEREIN THE SECOND NOTIFICATION IS BASED ON THE STATUS OF THE FIRST USER FINANCIAL GOAL — 409

*FIG. 4*

SYSTEMS AND METHODS FOR DETERMINING A GRAPHICAL USER INTERFACE FOR GOAL DEVELOPMENT

CROSS-REFERENCE TO RELATED APPLICATION(S)

This patent application is a continuation of and claims the benefit of priority to U.S. Nonprovisional patent application Ser. No. 16/793,800, filed on Feb. 18, 2020, the entirety of which is incorporated herein by reference.

TECHNICAL FIELD

Various embodiments of the present disclosure relate generally to determining graphical user interfaces for goal vision development.

BACKGROUND

Consumers utilizing an account for a specific goal may desire the ability to gather and process their personal information to generate suggested plans to help them reach their goal. A consumer's personal information may be found in various third-party systems. However, consumers may have difficulty assessing what information and third-party data is pertinent to their specific goal, for example, financial goal, since personal financial data is constantly changing and affected by various circumstances. Consumers may also desire the ability to connect their financial goal with a specific image and/or object and to allow friends and/or family to contribute to their financial goal.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods, systems, and non-transitory computer-readable media are disclosed for developing graphical user interfaces for goal vision development. Each of the examples disclosed herein may include one or more of the features described in connection with any of the other disclosed examples.

In one embodiment, a computer-implemented method for determining a graphical user interface for goal vision development may include receiving, via one or more processors, a first user financial goal of a user from a user device associated with the user; obtaining, via the one or more processors, at least one first user digital image; associating, via the one or more processors, the first user financial goal and the at least one first user digital image; obtaining, via the one or more processors, first user specific data relevant to the first user financial goal; transmitting, via the one or more processors, a digital visualization board indicative of the associated first user financial goal and the at least one first user digital image to the user device; determining, via the one or more processors, activity associated with the first user financial goal based on the first user specific data, by processing data including the obtained first user specific data using a trained machine learning model; and transmitting, via the one or more processors, a notification to the user device, wherein the notification is indicative of a suggested plan to achieve the first user financial goal, and wherein the notification is based on the determined activity and the first user financial goal.

In another embodiment, a computer system for determining a graphical user interface for goal vision development may include a memory storing instructions; and one or more processors configured to execute the instructions to perform operations including: receiving, via the one or more processors, a first user financial goal of a user from a user device associated with the user; obtaining, via the one or more processors, at least one first user digital image; associating, via the one or more processors, the first user financial goal and the at least one first user digital image; obtaining, via the one or more processors, first user specific data relevant to the first user financial goal; transmitting, via the one or more processors, a digital visualization board indicative of the associated first user financial goal and the at least one first user digital image to the user device; retrieving, via the one or more processors, transactional data of the user relevant to the first user financial goal; determining, via the one or more processors, activity associated with the first user financial goal, by processing data including the obtained first user specific data and the retrieved transactional data using a trained machine learning model; and transmitting, via the one or more processors, a notification to the user device, wherein the notification is indicative of a suggested plan to achieve the first user financial goal, wherein the notification is based on the determined activity and the first user financial goal.

In another example, a computer-implemented method for determining a graphical user interface for goal vision development may include receiving, via one or more processors, a first user financial goal of a user from a user device associated with the user; obtaining, via the one or more processors, at least one first user digital image; associating, via the one or more processors, the first user financial goal and the at least one first user digital image; obtaining, via the one or more processors, first user specific data relevant to the first user financial goal, wherein the first user specific data includes at least one of a user-specified duration of time, a user-specified number of transactions, or a user-specified monetary amount; transmitting, via the one or more processors, a digital visualization board indicative of the associated first user financial goal and the at least one first user digital image to the user device; determining, via the one or more processors, activity associated with the first user financial goal based on the first user specific data, by processing data including the obtained first user specific data using a trained machine learning model; transmitting, via the one or more processors, a notification to the user device, wherein the notification is indicative of a suggested plan to achieve the first user financial goal, and wherein the notification is based on the determined activity and the first user financial goal; determining, via the one or more processors, a status of the first user financial goal; and transmitting, via the one or more processors, a second notification to the first user device, wherein the second notification is based on the status of the first user financial goal.

According to additional aspects of the disclosure, a non-transitory computer-readable medium stores instructions that, when executed by one or more processors, cause the one or more processors to perform the aforementioned computer-implemented method or the operations that the aforementioned computer systems are configured to perform.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts a flowchart of an exemplary method for goal vision development, according to one or more embodiments.

FIG. 3 depicts a flowchart of an exemplary method for goal vision development, according to one or more embodiments.

FIG. 4 depicts a flowchart of an exemplary method for goal vision development, according to one or more embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of +10% of a stated or understood value.

In the following description, embodiments will be described with reference to the accompanying drawings. As will be discussed in more detail below, in various embodiments, data such as first user specific data, transactional data, or financial data, may be used to determine activity associated with the first user financial goal. This determination of activity may be used to generate one or more notifications and/or suggested plans based on the determined activity and the first user financial goal, relative to the first user specific data, transactional data, or financial data.

Figure 1:
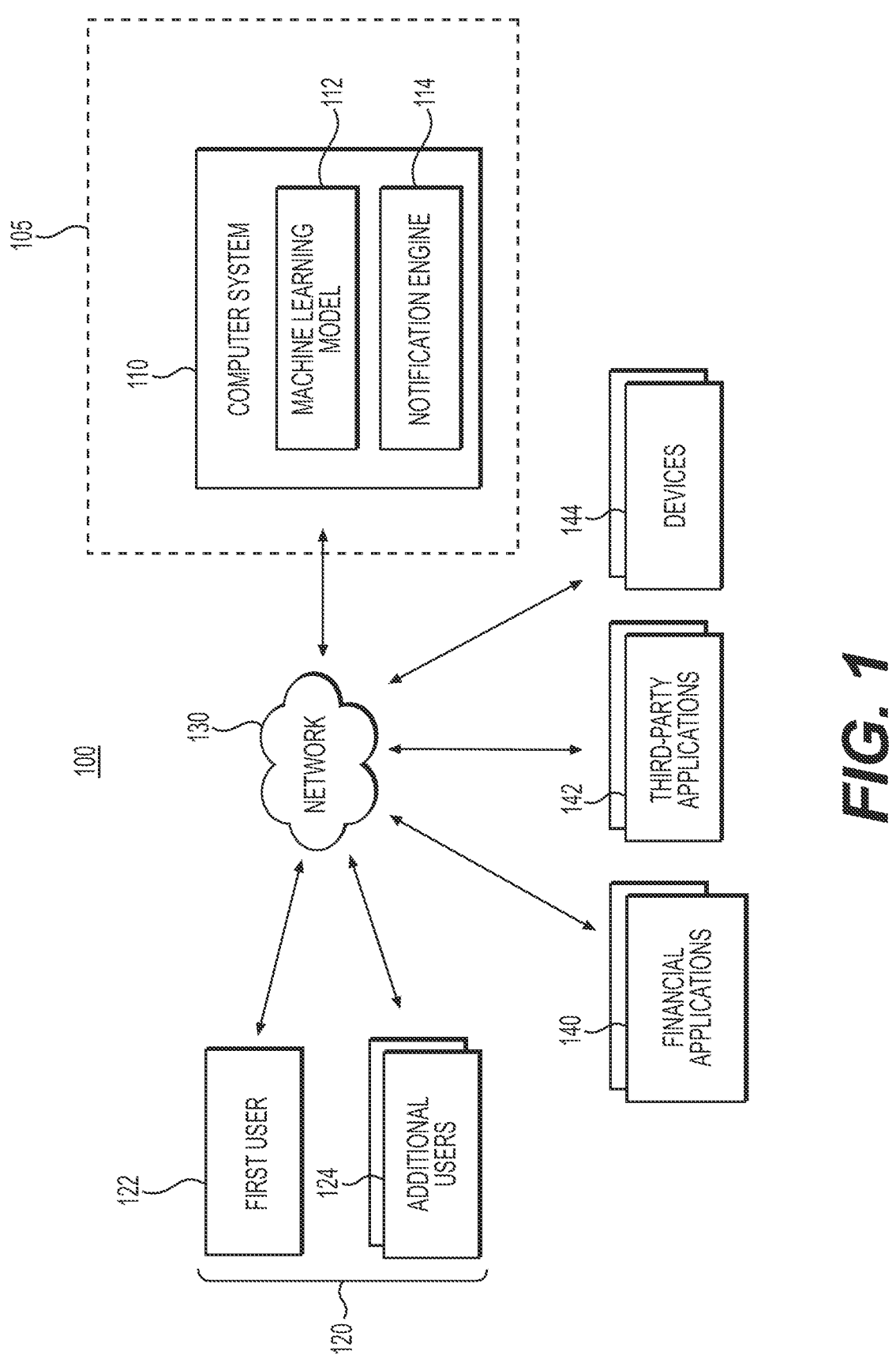
FIG. 1 depicts an exemplary system infrastructure, according to one or more embodiments.

FIG. 1 is a diagram depicting an example of a system environment 100 according to one or more embodiments of the present disclosure. The system environment 100 may include a computer system 110, one or more users 120, financial application(s) 140, third party application(s) 142, and device(s) 144. These components may be connected to one another by a network 130.

The computer system 110 may have one or more processors configured to perform methods described in this disclosure. User 122 may be referred to as a "first user," which is used to refer to a user whose financial goal may be received and who may then receive a notification as evaluated by the computer system 110. The computer system 110 may include a machine learning model 112 and a notification engine 114, which may each be software components stored in the computer system 110. The computer system 110 may be configured to utilize the machine learning model 112 and/or notification engine 114 when performing various methods described in this disclosure. Machine learning model 112 may be a plurality of machine learning models.

In some examples, the computer system 110 may have a cloud computing platform with scalable resources for computation and/or data storage, and may run one or more applications on the cloud computing platform to perform various computer-implemented methods described in this disclosure.

Computer system 110 may be configured to receive data from other components (e.g., users 120, financial applications 140, third party applications 142, and/or devices 144) of the system environment 100 via network 130. Computer system 110 may further be configured to utilize the received data by inputting the received data into the machine learning model 112 to produce a result. Information indicating the result may be transmitted to first user 122 over the network 130. In some examples, the computer system 110 may be referred to as a server system that provides a service including providing the information indicating the result to first user 122. Additionally, a computing device of the first user 122 may operate a client program, also referred to as a user application, used to communicate with the computer system 110. This user application may be used to provide information to the computer system 110 and to receive information from the computer system 110. In some examples, the user application may be a mobile application that is run on a mobile device (e.g., device 144) operated by first user 122. The user application may be an app, desktop application, website, cloud service, etc.

Users 120 may wish to determine financial goal vision development. In this disclosure, first user 122 may have a different or similar financial goal than additional users 124. Additional users 124 may desire to provide assistance to first user 122, for example, in the form of monetary funds.

Network 130 may be any suitable electronic network or combination of networks and may support any appropriate protocol suitable for communication of data to and from the computer system 110 and between various other components in the system environment 100. Network 130 may include a public network (e.g., the internet), a private network (e.g., a network within an organization), or a combination of public and/or private networks.

Financial applications 140, also referred to as "financial institutions" or "financial transaction applications," provide users with the ability to store, collect, and save money, wherein the applications may have the ability to accept and/or withdraw funds, for example, from a bank account. Therefore, financial applications 140 may collect and store transactional data pertaining to user transactions.

The users 120 and financial applications 140 may each include one or more computer systems configured to gather, process, transmit, and/or receive data. In general, whenever any of the users 120 and financial applications 140 are described as performing an operation of gathering, processing, transmitting, or receiving data, it is understood that such operation may be performed by a computer system thereof. In general, a computer system may include one or more computing devices, as described in connection with FIG. 5, below.

Third-party applications 142 may include other computer systems, such as web servers, that are accessible by computer system 110. Such resources may provide information, such as transactional data of the first user or financial data of the first user.

Devices 144 may each be a computer system. Examples of devices 144 may include computers, smartphones, wearable computing devices, or tablet computers. Devices 144 may be capable of transmitting information, for example, digital images, first user specific data, and first user financial goal. For example, devices 144 may have an application configured to transmit data indicating a first user financial goal to computer system 110.

Although financial applications 140, third-party applications 142, devices 144, machine learning model 112, notification engine 114, etc., of FIG. 1 are depicted as separate entities installed on different computing devices, this implementation is exemplary. Techniques discussed herein may be executed on a single device, or on any number of devices, with these techniques being performed in any combination on the any number of devices.

Computer system 110 may be part of entity 105, which may be any type of company, organization, or institution. In some examples, the entity 105 may be a financial services provider. In such examples, the computer system 110 may have access to data pertaining to user transactions through a private network within the entity 105. For example if the entity 105 is a card issuer, entity 105 may collect and store transactions involving a credit card or debit card issued by the entity 105. In such examples, the computer system 110 may still receive transactional data from other financial applications 140.

FIG. 2 is a flowchart illustrating a method for financial goal vision development, according to one or more embodiments of the present disclosure. The method may be performed by computer system 110. For purposes of illustration, user 122 is used as an example of the first user, and entity 105, operating the computer system 110, is assumed to be a financial services provider.

Step 201 may include receiving, via one or more processors, a first user financial goal of a user from a user device associated with the user. The first user financial goal may be, for example, a monetary amount that the user may want to save and/or a specific item (e.g., a vacation or a car) that the user may want to save for. The first user financial goal may be inputted into the user device associated with the user.

Step 202 may include obtaining, via the one or more processors, at least one first user digital image. The digital image may include, for example, at least one image, wherein the image may be obtained from the internet, third-party applications, the first user, or additional users. Such digital image may be communicated to computer system 110 using, for example, a device of the first user. Step 202 may further include associating, via the one or more processors, a product with the digital visualization board, wherein the product is related to the first user financial goal.

Step 203 may include associating, via the one or more processors, the first user financial goal and the at least one first user digital image. The first user digital image may represent or relate to the first user financial goal. For example, if the first user financial goal is directed to saving money for a vehicle, the digital image may be a car.

Step 204 may include obtaining, via the one or more processors, first user specific data relevant to the first user financial goal. Obtaining the first user specific data may include obtaining at least one of a user-specified duration of time, a user-specified number of transactions, or a user-specified monetary amount. For example, a user-specified duration of time may be a span of time first user has to reach the first user financial goal; a user-specified number of transactions may be an amount of times the first user 122 may want to save money to reach the first user financial goal, for example, the amount of times in a month or in a year first user 122 wants to put money into a savings account; or a user-specified monetary amount may be how much money the first user 122 wants to save in each transaction.

Step 205 may include transmitting, via the one or more processors, a digital visualization board indicative of the associated first user financial goal and the at least one first user digital image to the user device. The digital visualization board may include various information and/or images that may have been received in step 201 or obtained in step 202 or 204.

Step 206 may include determining, via the one or more processors, activity associated with the first user financial goal based on the first user specific data, by processing data including the obtained first user specific data using a trained machine learning model. Determining the activity associated with the first user financial goal includes processing data collected from a third-party application. The data collected from the third-party application may include transactional data of the first user or financial data of the first user. This data may also be inputted into machine learning model 112.

The machine learning model 112 may be a regression-based model that accepts the data obtained in step 204 as input data. The machine learning model 112 may be of any suitable form, and may include, for example, a neural network or deep neural network. The machine learning model 112 may compute the activity as a function of the user-specified duration of time, user-specified number of transactions, or user-specified monetary amount, and one or more variables indicated in the input data. This function may be learned by training the machine learning model 112 with training sets.

The machine learning model 112 may be trained (prior to its usage in step 204) by supervised, unsupervised, or semi-supervised learning, using training sets comprising data of types similar to the type of data used as the model input. For example, the training set used to train the model 112 may include any combination of the following: data relevant to the first user financial goal; first user specific data; transactional data of the first user 122 collected from third-party applications; financial data of the first user 122 collected from third-party applications; and/or data indicating other first user 122 activity.

Accordingly, the machine learning model 112 may be trained to map input variables to the first user specific data. That is, the machine learning model 112 may be trained to determine a duration of time or a suggested number of transactions as a function of various input variables. Such input variables may describe a user-specified duration of time (e.g., span of time first user has to reach the first user financial goal), a user-specified number of transactions (e.g., amount of times the first user 122 may want to save money to reach the first user financial goal, for example, amount of times in a month or in a year), or a user-specified monetary amount (e.g., how much money the first user 122 wants to save in each transaction).

Step 207 may include transmitting, via the one or more processors, a notification to the user device, wherein the notification is indicative of a suggested plan to achieve the first user financial goal, and wherein the notification is based on the determined activity and the first user financial goal. The suggested plan may identify at least one of a suggested duration of time or a suggested number of transactions to reach the first user financial goal.

In other examples, the method for financial goal vision development may include identifying, via the one or more processors, one or more additional users having at least one characteristic in common with the first user. The characteristics may be, for example, a user financial goal or a user digital image, wherein the user financial goal is related to the first user financial goal and the user digital image is related to the first user digital image. In these examples, the trained machine learning model may be a first trained machine learning model and the method may include determining a pattern of financial data of the one or more additional users via a second trained machine learning model. The suggested plan in step 207 may then be based on the determined activity associated with the first user, the first user specific data, and the pattern of financial data of the one or more additional users.

In other examples, the method of financial goal vision development may include determining, via the one or more processors, a status of the first user financial goal, and sending to the first user device, via the one or more processors, a notification based on the status of the first user financial goal. The status of the first user financial goal may be indicative of at least one or a combination of: (a) how much money has been saved, relative to the first user financial goal; (b) how much money needs to be saved to reach the first user financial goal; or (c) the duration of time required to reach the first user financial goal.

Any of the aforementioned data pertaining to first user 122 or other users 124 may be anonymized, such that the information transmitted to the first user 122 is not associable with personal identities. Additionally, the computer system 110 may be configured to perform the method of FIG. 2 only when the input data is of the extent that anonymity of the first user 122 or other users 124 may be protected. Additionally, step 206 may be repeated for a plurality of periods of time within the duration that the first user is attempting to achieve the first user financial goal.

FIG. 3 is a flowchart illustrating a method for financial goal vision development. The method may include receiving, via the one or more processors, a first user financial goal of a user from a user device associated with the user (step 301); obtaining, via the one or more processors, at least one first user digital image (step 302); associating, via the one or more processors, the first user financial goal and the at least one first user digital image (step 303); obtaining, via the one or more processors, first user specific data relevant to the first user financial goal (step 304); transmitting, via the one or more processors, a digital visualization board indicative of the associated first user financial goal and the at least one first user digital image to the user device (step 305); retrieving, via the one or more processors, transactional data of the first user relevant to the first user financial goal (step 306); determining, via the one or more processors, activity associated with the first user financial goal, by processing data including the obtained first user specific data and the retrieved transactional data using a trained machine learning model (step 307); and transmitting, via the one or more processors, a notification to the user device, wherein the notification is indicative of a suggested plan to achieve the first user financial goal, wherein the notification is based on the determined activity and the first user financial goal (step 308). Steps 301, 302, 303, 304, 305, 307, and 308 may respectively correspond to steps 201, 202, 203, 204, 205, 206, and 207 of FIG. 2, and may include any of the features discussed for steps 201, 202, 203, 204, 205, 206, and 207, above.

In step 306, transactional data of the first user relevant to the first user financial goal may be retrieved from institutions or financial transaction applications. Transactional data of the first user relevant to the first user financial goal may include transactional details, such as the amount of a transaction and the timestamp of the transaction, so as to permit an assessment of the frequency and/or number of transactions during a certain period of time.

In other examples, the method for financial goal vision development may further include identifying, via the one or more processors, financing options related to the first user financial goal. Financing options that may be identified include, but are not limited to, loan options or credit card options. For example, if the first user financial goal is to save enough money for a car, possible auto loans and financing options the first user may be qualified for may be identified and provided to the first user.

In some examples, the method for financial goal vision development may further include identifying, via the one or more processors, travel options related to the first user financial goal. For example, if the first user financial goal is to save enough money for a trip to a desired location, possible travel routes, hotels, and/or uses of credit card points and/or miles may be identified and provided to the user.

In step 308, the suggested plan may identify at least one of a suggested duration of time, a suggested number of transactions, suggested financing options, or suggested travel options, as discussed above.

In other examples, the method for financial goal vision development may include identifying, via the one or more processors, one or more additional users having at least one characteristic in common with the first user. The characteristics may be, for example, a user financial goal or a user digital image, wherein the user financial goal is related to the first user financial goal and the user digital image is related to the first user digital image. In these examples, the trained machine learning model may be a first trained machine learning model, the method further including determining a pattern of financial data of the one or more additional users via a second trained machine learning model. The suggested plan in step 308 may then be based on the determined activity associated with the first user, the first user specific data, and the pattern of financial data of the one or more additional users.

In some examples, the method for financial goal vision development may further include determining, via the one or more processors, a status of the first user financial goal, and sending to the first user device, via the one or more processors, a notification based on the status of the first user financial goal. The status of the first user financial goal may be indicative of at least one or a combination of: (a) how much money has been saved, relative to the first user financial goal; (b) how much money needs to be saved to reach the first user financial goal; or (c) the duration of time required to reach the first user financial goal.

FIG. 4 is a flowchart illustrating a method for financial goal vision development. The method may include receiving, via one or more processors, a first user financial goal of a user from a user device associated with the user (step 401); obtaining, via the one or more processors, at least one first user digital image (step 402); associating, via the one or more processors, the first user financial goal and the at least one first user digital image (step 403); obtaining, via the one or more processors, first user specific data relevant to the first user financial goal, wherein the first user specific data includes at least one of a user-specified duration of time, a user-specified number of transactions, or a user-specified monetary amount (step 404); transmitting, via the one or more processors, a digital visualization board indicative of the associated first user financial goal and the at least one first user digital image to the user device (step 405); determining, via the one or more processors, activity associated with the first user financial goal based on the first user specific data, by processing data including the obtained first user specific data using a trained machine learning model (step 406); transmitting, via the one or more processors, a notification to the user device, wherein the notification is indicative of a suggested plan to achieve the first user financial goal, and wherein the notification is based on the determined activity and the first user financial goal (step 407); determining, via the one or more processors, a status of the first user financial goal (step 408); and transmitting, via the one or more processors, a second notification to the first user device, wherein the second notification is based on the status of the first user financial goal (step 409). Steps 401, 402, 403, 404, 405, 406, and 407 respectively correspond to steps 201, 202, 203, 204, 205, 206, and 207 of FIG. 2, and may include any of the features discussed for steps 201, 202, 203, 204, 205, 206, and 207, above.

In other examples, the method for financial goal vision development may include identifying, via the one or more processors, one or more additional users having at least one characteristic in common with the first user. The characteristics may be, for example, a user financial goal or a user digital image, wherein the user financial goal is related to the first user financial goal and the user digital image is related to the first user digital image. In these examples, the trained machine learning model may be a first trained machine learning model, the method further including determining a pattern of financial data of the one or more additional users via a second trained machine learning model. The suggested plan in step 407 may then be based on the determined activity associated with the first user, the first user specific data, and the pattern of financial data of the one or more additional users.

In general, any process discussed in this disclosure that is understood to be computer-implementable, such as the processes illustrated in FIGS. 2-4, may be performed by one or more processors of a computer system, such as computer system 110, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 110, may include one or more computing devices. If the one or more processors of the computer system 110 are implemented as a plurality of processors, the plurality of processors may be included in a single computing device or distributed among a plurality of computing devices. If a computer system 110 comprises a plurality of computing devices, the memory of the computer system 110 may include the respective memory of each computing device of the plurality of computing devices.

Figure 5:
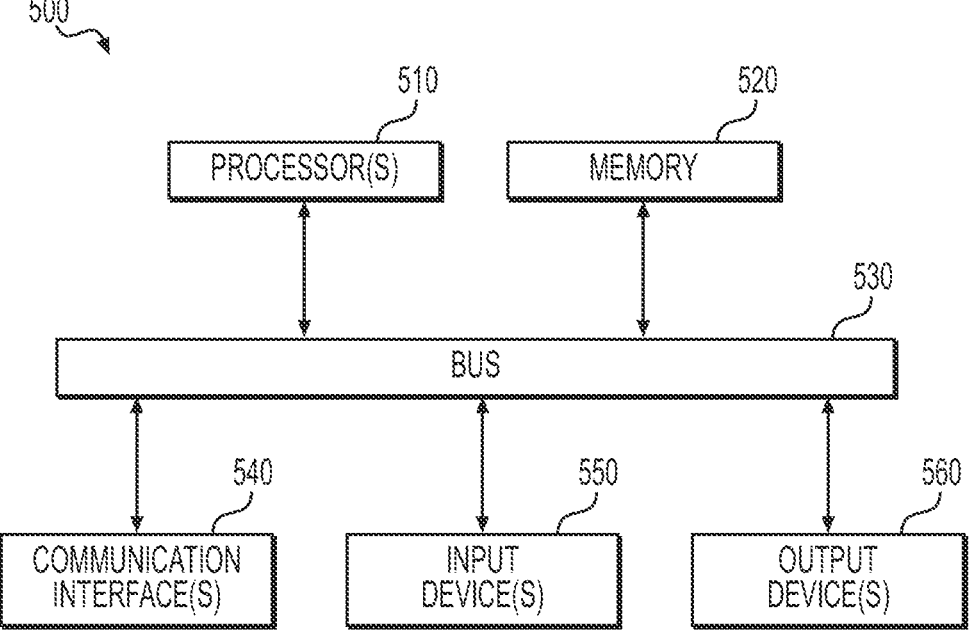
FIG. 5 depicts an example of a computing device, according to one or more embodiments.

FIG. 5 illustrates an example of a computing device 500 of a computer system, such as computer system 110. The computing device 500 may include processor(s) 510 (e.g., CPU, GPU, or other such processing unit(s)), a memory 520, and communication interface(s) 540 (e.g., a network interface) to communicate with other devices. Memory 520 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 520. The computing device 500 may, in some embodiments, further include input device(s) 550 (e.g., a keyboard, mouse, or touchscreen) and output device(s) 560 (e.g., a display, printer). The aforementioned elements of the computing device 500 may be connected to one another through a bus 530, which represents one or more buses. In some embodiments, the processor(s) 510 of the computing device 500 includes both a CPU and a GPU.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method, comprising:
obtaining, via one or more processors, activity data and objectives associated with one or more users;
training, via the one or more processors, at least one or more machine learning models using the activity data and the objectives such that the at least one or more machine learning models is configured to continuously learn to predict relationships between the activity data and the objectives associated with the one or more users, by mapping activity patterns between the activity data and whether they contribute to achieving the objectives;
continuously receiving, via the one or more processors, from a third party application server over a network, online activity data of a user and at least one objective of the user;
based on the continuously received online activity data of the user, predicting, using the at least one or more trained machine learning models, that activity from the online activity data of the user is related to the at least one objective of the user;
determining, using the at least one or more trained machine learning models, progress of the user towards achieving the at least one objective of the user based at least on the continuously received online activity data of the user and the mapped activity patterns;
generating, using the at least one or more trained machine learning models, a suggested plan for achieving the at least one objective by mapping the progress of the user toward achieving the at least one objective of the user;
generating, via the one or more processors, a graphical interface for mapping the progress of the activity of the user towards achieving the at least one objective;
determining, using the at least one or more trained machine learning models, a status of the activity towards achieving the at least one objective, the status determined periodically at a plurality of periods based on a plurality of activities and the at least one objective;
repeatedly generating the graphical user interface for transmission to a user device; and
transmitting, via the one or more processors, a notification to the user device, wherein the notification includes the status of the activity towards achieving the at least one objective and is automatically updated periodically at the plurality of periods.

2. The computer-implemented method of claim 1, wherein prior to obtaining the activity data relating to the at least one objective, the method comprises:
receiving a plurality of objectives and at least one digital image representing each of the plurality of objectives from user devices of a plurality of users; and
receiving the at least one objective and a first digital image representing the at least one objective from the user device of the user.

3. The computer-implemented method of claim 2, wherein prior to predicting the activity of the user is related to the at least one objective of the user, the method comprises: determining, using the at least one or more trained machine learning models, one or more characteristics of the at least one digital image for each of the plurality of objectives.

4. The computer-implemented method of claim 3, wherein predicting the activity of the user is related to the at least one objective of the user comprises: determining, using the at least one or more trained machine learning models, the one or more characteristics of the at least one digital image representing the at least one objective of the user is in common with a first characteristic of the first digital image.

5. The computer-implemented method of claim 1, wherein the at least one objective associated with the user includes a total duration objective for achieving the at least one objective, the method further comprising:
determining the activity of the user toward the at least one objective as a function of a corresponding total duration objective for achieving the at least one objective.

6. The computer-implemented method of claim 1, wherein the at least one objective associated with the user includes a quantity objective for achieving the at least one objective, the method further comprising:
determining the activity of the user toward the at least one objective as a function of a corresponding quantity objective for achieving the at least one objective.

7. The computer-implemented method of claim 1, wherein the at least one objective associated with the user includes a recurring amount objective for achieving the at least one objective, the method further comprising:
determining the activity of the user toward the at least one objective as a function of a corresponding recurring amount objective for achieving the at least one objective.

8. The computer-implemented method of claim 1, further comprising:
determining at least one product relevant to the at least one objective; and
associating at least one objective with the at least one product.

9. The computer-implemented method of claim 1, wherein prior to obtaining the activity data relating to the at least one objective for achieving the at least one objective, the method comprises:
receiving input data indicative of the activity data relating to the at least one objective for achieving the at least one objective from a user device associated with the user; and
receiving input data indicative of user data and user-specified criteria from the user device of the user.

10. The computer-implemented method of claim 1, wherein the suggested plan includes a suggested duration of time for achieving the at least one objective, the method further comprising:

determining the suggested duration of time for achieving the at least one objective as a function of user-specified criteria of the user; and generating the graphical interface based on the suggested duration of time for achieving the at least one objective.

11. The computer-implemented method of claim 1, wherein the suggested plan includes a suggested number of transactions for achieving the at least one objective, the method further comprising:

determining the suggested number of transactions for achieving the at least one objective as a function of a user-specified criteria of the user; and generating the graphical interface based on the suggested number of transactions for achieving the at least one objective.

12. The computer-implemented method of claim 1, wherein the suggested plan includes a suggested financing option for achieving the at least one objective, the method further comprising:

determining the suggested financing option for achieving the at least one objective as a function of user-specified criteria of the user; and generating the graphical interface based on the suggested financing option for achieving the at least one objective.

13. The computer-implemented method of claim 1, wherein the suggested plan includes a suggested travel option for achieving the at least one objective, the method further comprising:

determining the suggested travel option for achieving the at least one objective as a function of user-specified criteria of the user; and generating the graphical interface based on the suggested travel option for achieving the at least one objective.

14. The computer-implemented method of claim 1, wherein the status includes a first amount that is saved relative to the at least one objective, a second amount that remains to be saved relative to the at least one objective, and a minimum duration measurement that remains to achieve the at least one objective.

15. A system, comprising: a memory storing instructions; and one or more processors configured to execute the instructions to perform operations including:

obtaining activity data and objectives associated with one or more users;

training, via the one or more processors, at least one or more machine learning models, using the activity data and the objectives to predict relationships between the activity data and the objectives by mapping activity patterns of the activity data that contribute to achieving the objectives;

continuously receiving, from a third party application server over a network, online activity data of the user and at least one objective of the user;

based on the continuously received online activity data of the user, predicting, using the at least one or more trained machine learning models, that activity from the online activity data of the user is related to the at least one objective of the user;

determining, using the at least one or more trained machine learning models, progress of the user towards achieving the at least one objective of the user based at least on the continuously received online activity data of the user and the mapped activity patterns;

generating, using the at least one or more-trained machine learning models, a suggested plan for achieving the at least one objective by mapping the progress of the user achieving the at least one objective of the user;

generating a graphical interface for mapping the progress of the activity of the user towards achieving the at least one objective;

determining, using the at least one or more-trained machine learning models, a status of the activity towards achieving the at least one objective, the status determined periodically at a plurality of periods based on a plurality of activities and the at least one objective;

repeatedly generating the graphical user interface for transmission to a user device; and transmitting a notification to the user device, wherein the notification includes the status of the activity towards achieving the at least one objective and is automatically updated periodically at the plurality of periods.

16. The system of claim 15, wherein prior to predicting that the activity of the user is related to the at least one objective, the operations comprise: determining, using the at least one or more trained machine learning models, one or more characteristics of at least one digital image for the at least one objective.

17. The system of claim 16, wherein predicting the activity of the user is related to the at least one objective of the user comprises:

determining, using the at least one or more trained machine learning models, one or more characteristics of at least one digital image representing the objective of the user is in common to a first characteristic of the first digital image.

18. The system of claim 15, wherein the status of the activity towards the at least one objective includes a first amount that is saved relative to the at least one objective, a second amount that remains to be saved relative to the at least one objective, and a minimum duration measurement that remains to achieve the at least one objective.

19. A non-transitory computer-readable medium storing instructions that, when executed by a processor, cause the processor to perform a method, the method comprising:

obtaining activity data and objectives associated with one or more users;

training, via the one or more processors, at least one or more machine learning models, using the activity data and the objectives to predict relationships between the activity data and the objectives by mapping activity patterns of the activity data that contribute to achieving the objectives;

continuously receiving, from a third party application server over a network, online activity data of the user and at least one objective of the user;

based on the continuously received online activity data of the user, predicting, using the at least one or more trained machine learning models, that activity from the online activity data of the user is related to the at least one objective of the user;

determining, using the at least one or more trained machine learning models, progress of the user towards achieving the at least one objective of the user based at least on the continuously received online activity data of the user and the mapped activity patterns;

generating, using the at least one or more trained machine learning models, a suggested plan for achieving the at least one objective by mapping the progress of the user toward achieving the at least one objective of the user;

generating a graphical interface for mapping the progress of the activity of the user towards achieving the at least one objective;

determining, using the at least one or more trained machine learning models, a status of the activity towards achieving the at least one objective, the status determined periodically at a plurality of periods based on a plurality of activities and the at least one objective;

repeatedly generating the graphical user interface for transmission to a user device; and transmitting a notification to the user device, wherein the notification includes the status of the activity towards achieving the at least one objective and is automatically updated periodically at the plurality of periods.

20. The non-transitory computer-readable medium of claim 19, wherein prior to obtaining the activity data relating to the at least one objective of the one or more users, the method further comprises:

receiving the at least one objective and at least one digital image representing the at least one objective from a user device; and receiving the at least one objective and a first digital image representing the at least one objective from a user device of the user.

* * * * *